United States Patent
Dhanakshirur et al.

(10) Patent No.: US 8,126,716 B2
(45) Date of Patent: Feb. 28, 2012

(54) METHOD AND SYSTEM FOR COLLECTING AUDIO PROMPTS IN A DYNAMICALLY GENERATED VOICE APPLICATION

(75) Inventors: Girish Dhanakshirur, Delray Beach, FL (US); James R. Lewis, Delray Beach, FL (US)

(73) Assignee: Nuance Communications, Inc., Burlington, MA (US)

(*) Notice: Subject to any disclaimer, the term of this patent is extended or adjusted under 35 U.S.C. 154(b) by 387 days.

(21) Appl. No.: 11/207,292

(22) Filed: Aug. 19, 2005

(65) Prior Publication Data

US 2007/0043568 A1  Feb. 22, 2007

(51) Int. Cl.
*G10L 13/00* (2006.01)

(52) U.S. Cl. ................................. 704/258; 704/260

(58) Field of Classification Search .......... 704/260, 704/277
See application file for complete search history.

(56) References Cited

U.S. PATENT DOCUMENTS

| | | | |
|---|---|---|---|
| 6,345,250 B1* | 2/2002 | Martin | 704/260 |
| 6,400,807 B1* | 6/2002 | Hewitt et al. | 379/88.11 |
| 6,633,848 B1 | 10/2003 | Johnson et al. | |
| 6,724,864 B1 | 4/2004 | Denenberg et al. | |
| 7,251,604 B1* | 7/2007 | Thenthiruperai | 704/270.1 |
| 7,277,855 B1* | 10/2007 | Acker et al. | 704/260 |
| 7,328,157 B1* | 2/2008 | Chu et al. | 704/260 |
| 7,509,178 B2* | 3/2009 | Logan et al. | 700/94 |
| 2002/0052747 A1* | 5/2002 | Sarukkai | 704/270 |
| 2002/0077819 A1* | 6/2002 | Girardo | 704/260 |
| 2002/0097848 A1 | 7/2002 | Wesemann et al. | |
| 2002/0184033 A1* | 12/2002 | Fitzpatrick et al. | 704/270.1 |
| 2003/0028378 A1* | 2/2003 | August et al. | 704/260 |
| 2003/0135373 A1* | 7/2003 | Diebolt et al. | 704/260 |
| 2004/0267882 A1 | 12/2004 | Whynot et al. | |
| 2005/0125232 A1* | 6/2005 | Gadd | 704/270.1 |
| 2005/0283764 A1* | 12/2005 | Chiu | 717/125 |

* cited by examiner

*Primary Examiner* — Richemond Dorvil
*Assistant Examiner* — Olujimi Adesanya
(74) *Attorney, Agent, or Firm* — Wolf, Greenfield & Sacks, P.C.

(57) ABSTRACT

A prompt collecting tool (190) for an interactive voice response system (100) includes a voice enabled application server (150), a voice simulator coupled to the voice enabled application server, and a processor coupled to the voice simulator. The processor can be programmed to execute (202) a voice application having a plurality of audio prompts, play (206) audio if a pre-stored audio is available for a particular prompt, capture (208) text when no pre-stored audio is available and forward (210) the captured text to the prompt collecting tool. The voice simulator can include a VoiceXML browser (160), a text to speech text service (170), and a text based recognition service (180) for example.

18 Claims, 2 Drawing Sheets

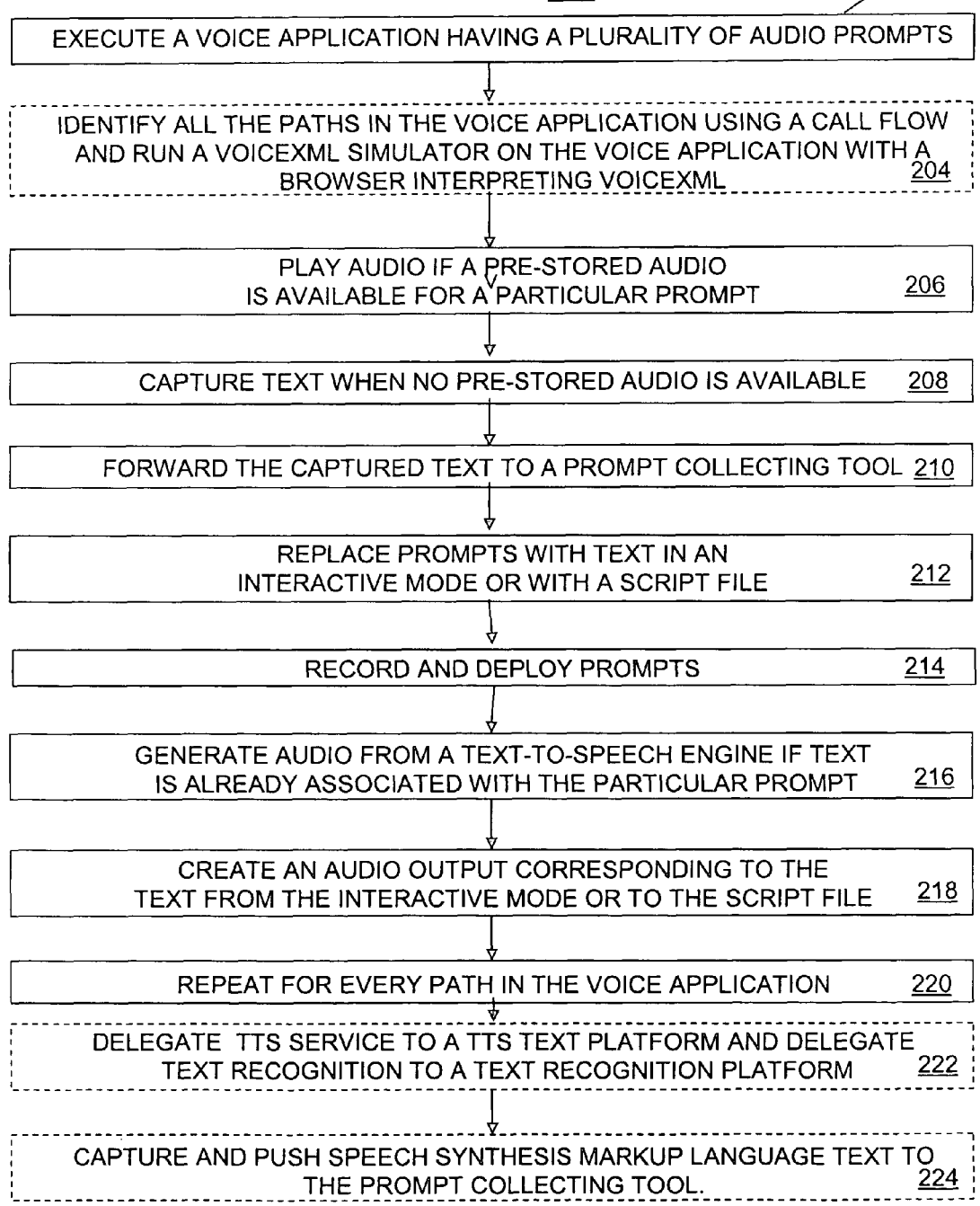

METHOD AND SYSTEM FOR COLLECTING AUDIO PROMPTS IN A DYNAMICALLY GENERATED VOICE APPLICATION

BACKGROUND OF THE INVENTION

1. Technical Field

This invention relates to the field of interactive voice response systems, and more particularly to a method and system for collecting audio prompts and replacing such prompts.

2. Description of the Related Art

With more and more Web applications being voice enabled, the tooling used in association with these applications significantly increases in importance to make it easier and more efficient for developers to code such applications. There are generally two aspects to these applications: (1) prompting a user and (2) a user's response.

With respect to prompting a user, either professionally recorded audio or audio generated by text to speech engines is typically used for play back of such prompts. With respect to a user's response, a Speech Recognition engine is used to capture the user's response and pass back the results to VoiceXML applications.

When developers voice-enable web applications, they tend to insert prompts wherever they can, especially when the data is generated dynamically (in other words, the placement of prompts might not be highly predictable—e.g., not necessarily enclosed in <audio> tags). To increase customer satisfaction and corporate brand image, many companies insist on the use of professionally recorded audio instead of Text to Speech (TTS) generated audio. The default behavior for VoiceXML thus plays stored audio for each prompt if available and properly formatted in <audio> tags, and otherwise synthesizes speech using a TTS engine. Such a scenario creates a challenging environment to capture all the prompts that are generated by TTS engines. A burdensome option would require going through each line of code and isolating the prompts, which becomes very difficult, if not impossible, when prompts are dynamically generated. Another option is for a developer to deploy the application with audio files and listen to every path to manually identify the TTS generated audio for the purpose of replacing TTS with professional recordings.

SUMMARY OF THE INVENTION

Embodiments in accordance with the present invention can facilitate the location of prompts in a particular system using, for example, a prompt collection tool. In this manner, professionally recorded audio can replace TTS generated audio for all captured prompts that do not have a recording.

In a first embodiment in accordance with the invention, a method of collecting audio prompts in a dynamically generated voice application can include the steps of executing a voice application having a plurality of audio prompts, playing audio if a pre-stored audio is available for a particular prompt, capturing text when no pre-stored audio is available, and forwarding the captured text to a prompt collecting tool. Then, the prompts can be recorded and deployed. The method can further include the step of generating audio from a text-to-speech engine if recorded audio is not desirable. The aforementioned steps can be repeated for every path in the voice application. In one aspect, the method can include identifying all the paths in the voice application using a call flow builder and running a VoiceXML Simulator on the voice application with a browser interpreting VoiceXML. In this regard, text-to-speech service can be delegated to a TTS text platform and recognition service can be delegated to a text recognition platform. The method can further include the steps of capturing and pushing Speech Synthesis Markup Language text to the prompt collecting tool.

In a second embodiment in accordance with the invention, a prompt collecting tool for an interactive voice response system can include a voice enabled application server, a voice simulator coupled to the voice enabled application server, and a processor coupled to the voice simulator. The processor can be programmed to execute a voice application having a plurality of audio prompts, play audio if a pre-stored audio is available for a particular prompt, capture text when no pre-stored audio is available, and forward the captured text to a prompt collecting tool. The voice enabled application service can include a web server, a telephone server, a dialogue server, and a voice server and the voice simulator can include a VoiceXML browser, a text to speech text service, and a text based recognition service for example. As noted above, the processor can be further programmed to generate audio from a text-to-speech engine if text is already associated with the particular prompt. The processor can also create an audio output corresponding to the text from the interactive mode or to the script file. In one aspect, the processor can identify all the paths in the voice application using a call flow builder and run a VoiceXML Simulator on the voice application with a browser interpreting VoiceXML. In this regard, text-to-speech service can be delegated to a TTS text platform and recognition can be delegated to a text recognition platform. The processor can further capture and push Speech Synthesis Markup Language (SSML) text to the prompt collecting tool.

In other aspects of the invention, a computer program having a plurality of code sections executable by a machine for causing the machine to perform certain steps is described. The steps can generally include the steps outlined in the first and second embodiments described above.

BRIEF DESCRIPTION OF THE DRAWINGS

There are shown in the drawings embodiments which are presently preferred, it being understood, however, that the invention is not limited to the precise arrangements and instrumentalities shown.

FIG. 2 is a flowchart illustrating a method for collecting prompts in accordance with an embodiment of the inventive arrangements disclosed herein.

DETAILED DESCRIPTION OF THE INVENTION

Figure 1:
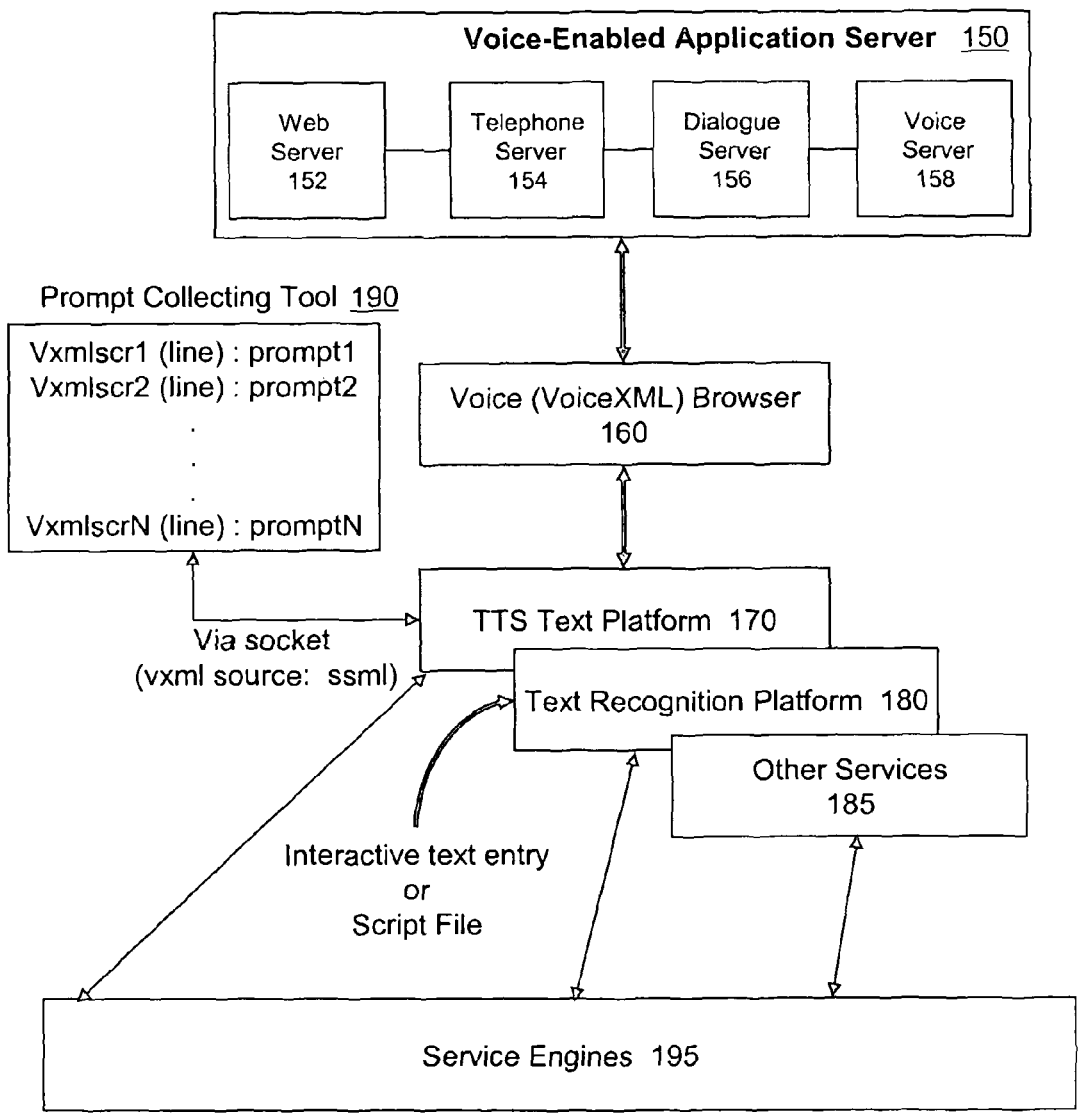
FIG. 1 is a schematic diagram illustrating a system for collecting prompts useful for speech development applications in accordance with an embodiment of the present invention.

Embodiments in accordance with the invention can provide a system and method of conveniently locating all the prompts in a system that do not have quality voice recordings associated with such prompts. Such a system can be a test environment for voice applications.

A test environment including one or more voice-enabled applications on a voice-enabled application server 150 can be represented by the system 100 illustrated in FIG. 1. The voice enabled application server 150 can include a Web Server 152, a Telephone Server 154, a Dialogue Server 156 or a Voice Server 158. The system 100 can be deployed as a simple environment including a single test machine or can be a complex, distributed environment including a voice browser 160 such as a VoiceXML Browser that utilizes a plurality of platform services such as a TTS Text Platform 170, a Text Recognition Platform 180 and Other Services 185. For example, the voice-enabled application represented within system 100 can be a turn-based voice-enabled application that utilizes one or more clusters of speech processing actions to perform speech processing tasks. The invention is not to be limited in this regard, however, and in another example, the voice-enabled application represented within system 100 can be a desktop voice-enabled application that utilizes local resources to provide the speech processing services. The system 100 further includes a Prompt Collecting Tool 190 as will be further detailed below.

In a more complex embodiment, a simulation platform manager (not shown) can be used and be optionally configured to simulate interactions of multiple distributed computing machines and distributed components within a more controlled computing space. The simulation platform manager can be used to manage a plurality of simulated services or services that are specifically configured for testing purposes. These services can include, but are not limited to, the aforementioned TTS Text Platform 170, Text Recognition Platform 180, as well as platform service, recognition service, text-to-speech (TTS) service, text based recognition service, and text based TTS service. In performing the services, the platform services can use one or more service engines 195, such as a telephony and media engine, an automatic speech recognition (ASR) engine, a text-to-speech engine, or other such engines.

The voice browser 160 can include a voice-enabled application that interprets voice markup languages to generate voice output and interpret voice input. As used herein, a voice markup language generally refers to a variety of voice-enabled languages including, but not limited to, a Voice eXtensible Markup Language (VoiceXML), a Speech Application Language Tags (SALT) language, an XML+Voice Profiles (X+V) language, a Speech Synthesis Markup Language (SSML), and other voice-enabled languages. In one embodiment, the voice browser 160 can operate in a centralized server or within a cluster of services that houses voice resources to handle voice-enabled markup, like VoiceXML-tagged content.

In accordance with a more specific embodiment of the present invention and with reference to FIG. 1, a VoiceXML Simulator with a browser 160 interpreting VoiceXML and delegating TTS service to a TTS Text platform 170 and recognition to a Text Recognition platform 180. When an application is executed, if pre-recorded audio is available for a particular prompt, the VoiceXML browser 160 plays the pre-recorded audio using media services. In the absence of an audio file, the VoiceXML browser 160 can send a request to the TTS Text Platform 170 to play audio by generating audio from a TTS engine (within the Service Engines 195). The TTS Text platform 170 in this case, can capture and push SSML (Speech Synthesis Markup Language) text to a prompt collecting tool 190 via socket with the source of the VoiceXML. Thus, when the audio is available it is played and when not available, the prompt is sent and added to the Prompt Collecting tool. The user can respond to the prompts via text in interactive mode or using a script file to drive the Text Recognition Platform 180. At the end of the session, the tool has captured all the prompts for a particular path. These prompts are recorded and deployed. When the voice application is re-run again, all the audio will be played by media services since the audio is available. The developer can track the prompts and allow some prompts to be generated from a TTS engine which will continue to appear on the prompt list.

To collect all the prompts for a particular voice application, a developer of voice applications can use a call flow builder to identify all the paths. The Developer can run the VoiceXML Simulator using the Text Mode for Audio and Text to Speech. The developer will hear the prompts if professional audio is available. If audio is not available, the tool can add the VoiceXML source file and the prompt to the list, and the voice application continues to execute. Once the particular path is covered, the developer can have a list of prompts, which are missing recordings. The developer can then record audio for these prompts and deploy the application. When the application is re-run, the developer will hear all the prompts in the particular path. The steps above are repeated for every path in the voice application.

Referring to FIG. 2, a flow chart illustrates a method 200 of collecting audio prompts in a dynamically generated voice application. The method 200 can include the step 202 of executing a voice application having a plurality of audio prompts, playing audio if a pre-stored audio is available for a particular prompt at step 206, capturing text when no pre-stored audio is available at step 208, forwarding the captured text to a prompt collecting tool at step 210, and replacing user input with text in an interactive mode or with a script file at step 212 Then, at step 214, the prompts can be recorded and deployed. The method 200 can further include the step 216 of generating audio from a text-to-speech engine if text is already associated with the particular prompt. The method 200 can also include the step 218 of creating an audio output corresponding to the text from the interactive mode or to the script file. The aforementioned steps can be repeated for every path in the voice application as noted at step 220. In one aspect, the method can include the step 204 of identifying all the paths in the voice application using a call flow builder and running a VoiceXML Simulator on the voice application with a browser interpreting VoiceXML. In this regard, text-to-speech service can be delegated to a TTS text platform and Voice recognition can be delegated to a text recognition platform at step 222. The method 200 can further include capturing and pushing Speech Synthesis Markup Language text to the prompt collecting tool at step 224.

It should be understood that the present invention can be realized in hardware, software, or a combination of hardware and software. The present invention can also be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for use with a voice application that is capable of playing back user prompts as both recorded audio and text-to-speech generated audio, the method comprising:
executing the voice application;
during the executing, for each user prompt that is to be played back as audio, determining whether corresponding recorded audio is available for the user prompt;
if it is determined that there is corresponding recorded audio available, playing the corresponding recorded audio; and
if it is determined that there is no corresponding recorded audio available for the user prompt, playing the user prompt as TTS-generated audio using a text-to-speech (TTS) engine; and
in response to determining, during the executing, that there is no corresponding recorded audio available for the user prompt:
capturing text of the user prompt as captured text; and
forwarding the captured text to a prompt collecting tool for adding the captured text to a set of prompt texts for which recorded audio is to be recorded.

2. The method of claim 1, further comprising:
recording the user prompts collected by the prompt collecting tool; and
for each prompt text in the set of prompt texts, incorporating into the voice application recorded audio corresponding to the prompt text such that, when a user prompt corresponding to the prompt text is to be played back as audio, the recorded audio is played, the recorded audio comprising an audio recording of a human speaking the prompt text.

3. The method of claim 1, wherein the method further comprises the step of:
repeating the aforementioned steps for every path in the voice application such that it can be determined, for all user prompts in the voice application, whether corresponding recorded audio is available.

4. The method of claim 1, wherein the method further comprises the step of identifying all the paths in the voice application using a call flow builder.

5. The method of claim 1, wherein the method further comprises the step of running a VoiceXML Simulator on the voice application with a browser interpreting VoiceXML.

6. The method of claim 5, wherein the method further comprises the step of delegating text-to-speech service to a text-to-speech text platform and voice recognition service to a text recognition platform.

7. The method of claim 6, wherein the method further comprises the step of capturing and pushing Speech Synthesis Markup Language text to the prompt collecting tool.

8. The method of claim 1, further comprising responding to a prompt of the plurality of audio prompts by utilizing at least one of text in an interactive mode and a script file.

9. The method of claim 8, further comprising creating an audio output corresponding to at least one of the text from the interactive mode and the script file.

10. The method of claim 1, further comprising:
replacing the TTS generated audio with professionally recorded audio for a user prompt having no corresponding recorded audio.

11. The method of claim 1, wherein the act of executing the voice application comprises executing a voice application that dynamically generates text for at least one user prompt,
wherein the act of playing the at least one user prompt, if it is determined that there is no corresponding recorded audio available for the at least one user prompt, comprises playing the dynamically-generated text as TTS-generated audio using the TTS engine for the at least one user prompt, and
wherein the act of forwarding the captured text to the prompt collection tool comprises forwarding the dynamically-generated text for the at least one user prompt.

12. A non-transitory machine-readable storage medium having stored thereon a computer program having code that, when executed by a machine, causes the machine to perform a method for use with a voice application that is capable of playing back user prompts as both recorded audio and text-to-speech generated audio, the method comprising:
executing the voice application;
during the executing, for each user prompt that is to be played back as audio,
determining whether corresponding recorded audio is available for the user prompt;
if it is determined that there is corresponding recorded audio available, playing the corresponding recorded audio;
if it is determined that there is no corresponding recorded audio available for the user prompt, playing the user prompt at a first time as TTS-generated audio using a text-to-speech (TTS) engine; and
in response to determining, during the executing, that there is no corresponding recorded audio available for the user prompt:
capturing text of the user prompt as captured text; and
forwarding the captured text to a prompt collecting tool for adding the captured text to a set of prompt texts for which recorded audio is to be recorded.

13. The non-transitory machine-readable storage of claim 12, wherein the method further comprises:
recording the user prompts collected by the prompt collecting tool; and
incorporating into the voice application the corresponding recorded audio for the user prompts into the voice application such that, when the voice application is re-executed, the corresponding recorded audio is played when the user prompts are to be played back.

14. The non-transitory machine-readable storage of claim 12, wherein, in the method, the act of executing the voice application comprises executing a voice application that dynamically generates text for at least one user prompt,
wherein, in the method, the act of playing the at least one user prompt, if it is determined that there is no corresponding recorded audio available for the at least one user prompt, comprises playing the dynamically-generated text as TTS-generated audio using the TTS engine for the at least one user prompt, and
wherein, in the method, the act of forwarding the captured text to the prompt collection tool comprises forwarding the dynamically-generated text for the at least one user prompt.

15. An apparatus comprising:
a machine programmed to execute a method for use with a voice application that is capable of playing back user prompts as both recorded audio and text-to-speech generated audio, the method comprising:
executing the voice application;
during the executing, for each user prompt that is to be played back as audio, determining whether corresponding recorded audio is available for the user prompt;

if it is determined that there is corresponding recorded audio available, playing the corresponding recorded audio;

if it is determined that there is no corresponding recorded audio available for the user prompt, playing the user prompt as TTS-generated audio using a text-to-speech (TTS) engine; and in response to determining, during the executing, that there is no corresponding recorded audio available for the user prompt:

capturing text of the user prompt as captured text; and forwarding the captured text to a prompt collecting tool for adding the captured text to a set of prompt texts for which recorded audio is to be recorded.

16. The apparatus of claim 15, wherein the machine is further programmed to:

record the user prompts collected by the prompt collecting tool; and for each prompt text in the set of prompt texts, incorporating into the voice application recorded audio corresponding to the prompt text such that, when a user prompt corresponding to the prompt text is to be played back as audio, the recorded audio is played, the recorded audio comprising an audio recording of a human speaking the prompt text.

17. The apparatus of claim 15, wherein, in the method, the act of executing the voice application comprises executing a voice application that generates text for at least one user prompt during execution, wherein, in the method, the act of playing the at least one user prompt, if it is determined that there is no corresponding recorded audio available for the at least one user prompt, comprises playing the text that is generated during the executing as TTS-generated audio using the TTS engine for the at least one user prompt, and wherein, in the method, the act of forwarding the captured text to the prompt collection tool comprises forwarding the text generated during the executing for the at least one user prompt.

18. The non-transitory machine-readable storage of claim 12, wherein the method further comprises:

at a second time later than the first time, for at least one prompt text in the set of prompt texts, playing recorded audio when a user prompt corresponding to the at least one prompt text is to be played back as audio, the recorded audio comprising an audio recording of a human speaking the prompt text.

* * * * *